United States Patent [19]

Haas

[11] B  4,002,772

[45] * Jan. 11, 1977

[54] METHOD OF INCREASING THE PERMEABILITY OF CELLULAR MATERIALS

[75] Inventor: Gerhard J. Haas, Woodcliff Lake, N.J.

[73] Assignee: General Foods Corporation, White Plains, N.Y.

[ * ] Notice: The portion of the term of this patent subsequent to Oct. 20, 1987, has been disclaimed.

[22] Filed: June 22, 1970

[21] Appl. No.: 48,560

[44] Published under the second Trial Voluntary Protest Program on March 30, 1976 as document No. B 48,560.

Related U.S. Application Data

[63] Continuation-in-part of Ser. No. 565,370, July 15, 1966, Pat. No. 3,535,126.

[52] U.S. Cl. .................. 426/281; 426/312; 426/318; 426/615; 426/640; 426/385; 426/425; 426/442; 426/444; 426/455; 426/465; 426/524

[51] Int. Cl.² .................. A23L 1/31; A23C 3/00

[58] Field of Search .............. 99/189, 192–195, 99/197, 199, 204, 208, 209, 103; 62/62, 63; 34/5; 426/281, 302, 312, 318, 615, 640, 385, 425, 442, 444, 455, 465, 524

[56] References Cited

UNITED STATES PATENTS

| | | | |
|---|---|---|---|
| 1,944,857 | 1/1934 | Atwell | 99/198 |
| 2,278,472 | 4/1942 | Musher | 99/192 |
| 2,509,299 | 5/1950 | Grom | 62/62 |
| 3,007,319 | 11/1961 | Ogden | 99/198 |
| 3,216,826 | 11/1965 | Wattenbarger | 99/189 |
| 3,281,950 | 11/1966 | Kautz | 34/5 |
| 3,535,126 | 10/1970 | Haas | 99/193 |

FOREIGN PATENTS OR APPLICATIONS

| | | | |
|---|---|---|---|
| 538,597 | 11/1931 | Germany | 99/198 |
| 521,715 | 5/1940 | United Kingdom | 99/198 |

*Primary Examiner*—Wilbur L. Bascomb, Jr.
*Assistant Examiner*—Martin G. Mullen
*Attorney, Agent, or Firm*—Thomas R. Savoie; Bruno P. Struzzi; Daniel J. Donovan

[57] ABSTRACT

Cellular food materials have been found to possess a relatively soft texture when they are frozen while under a gas pressure of greater than about 50 psig. This pressure freezing treatment also renders the foodstuff more permeable and porous, resulting in a product that will cook faster, can be dehydrated and rehydrated more quickly, and is more responsive to infusion or extraction processes.

11 Claims, No Drawings

METHOD OF INCREASING THE PERMEABILITY OF CELLULAR MATERIALS

BACKGROUND OF THE INVENTION

This application is a continuation-in-part of my co-pending application Ser. No. 565,370, filed July 15, 1966, now U.S. Pat. No. 3,535,126, issued Oct. 20, 1970.

Means are constantly being sought to render processes such as dehydration, extraction, or infusion less costly and more practical. It is well known that more permeable materials can be dried more easily than less permeable materials, which indicates that the rate of drying a substance is directly related to its permeability. In the present discussion permeability means the ability of gases or liquids to pass through a cellular material either by passing through its pores or by diffusing through the cell walls. If the number of pores and the pore size of the material is small, water passing from the interior to the surface of the material is restricted, whereas if the number of pores and the pore size is relatively large, water will pass through the material with little or no resistance. Also, more rapid water removal in a cellular material is effected when the cell walls of the material readily permit the diffusion of water through the walls. In a similar manner the rate of rehydration of a material increases as its permeability increases.

It is also desirable to have a more permeable cellular structure in a food material when it is desired to add uniformly various substances to the food. For instance, when it is desired to sweeten fruits the uniformity of the sweetness will depend upon how deep the sugar solution can penetrate the fruit being treated. A fruit having good permeability can be very easily and uniformly sweetened in a relatively short period of time, whereas a fruit having poor permeability will absorb the sweetening agent at a much slower rate, if at all.

Similarly it is desirable to have a more permeable cellular structure in a food material when it is desired to extract various substances from the food. For instance, when it is desired to extract caffeine from fresh green coffee beans with an appropriate solvent such as trichloroethylene, beans having improved permeability will be more uniformly and efficiently extracted.

Various methods have been attempted in the search for an efficient process for increasing the permeability of cellular materials. For instance, processes involving vacuum puffing of materials such as dough-containing snacks are often employed for the purpose of increasing the porosity of the food stuff. These processes are unsatisfactory for many purposes such as the treatment of fruits and vegetables, because in the expansion the cellular structure is destroyed and the fruit or vegetable loses its original shape and texture.

ADVANTAGES AND OBJECTS

The process taught in the present invention makes possible the modification of cellular foods such as fruits and vegetables such that they are much more permeable and yet the cell structure is substantially undisrupted and the cell walls exhibit very little gross cytological damage. There are many advantages of treating foods by the process of the present invention. First, when frozen foods have been frozen under pressure they cook much faster. A second advantage of the present invention is that pressure-frozen foods, when stored in the frozen state, retain their soft texture and can be eaten directly as removed from the freezer without the necessity of a thawing period. A third advantage of foods that are pressure-frozen is that because of their increased permeability substances can be more easily extracted from them when they are thawed and contacted with a fluid in which the substance to be extracted is soluble. Further, the converse of extraction, that is infusion of substances into a foodstuff to change the characteristics of the foodstuff, can also be more easily effected with foods that have been pressure-frozen, thawed and/or dehydrated, and then contacted with a fluid containing the substance to be infused. A fourth advantage is that pressure-frozen foods can be dehydrated more easily and the resulting dehydrated product is very much improved with regard to texture, size, color, flavor and rehydratability.

Any one or more of these benefits may be obtained when dried cellular foodstuffs have been pressure-frozen according to the present invention. Thus, coconut which has been pressure-frozen and then dried has a more tender texture, i.e. it is less chewy than dried coconut which has not been pressure-frozen. Again, when shrimps were pressure-frozen according to the present invention, the frozen shrimp not only had a softer texture, but maintained better color, giving the shrimp a more pleasing appearance than shrimp frozen by any of the prior art techniques. A further change observed when treating fruits and vegetables according to the present invention prior to drying is that there is often a considerable improvement in the flavor in the food. This was noticeable in such foods as tomatoes, apples, blueberries, strawberries, onions etc. Lastly, pressure-frozen foods are considerably larger than the same foods that have not been pressure-frozen.

Accordingly, it is the object of the present invention to provide a method of increasing the porosity of cellular material. It is another object of the invention to provide frozen foods that can be eaten without thawing. It is still another object of the invention to provide faster cooking frozen foods. It is a further object of the invention to provide a cellular material that will easily permit the extraction or infusion of flavor or color substances. It is a still further object of the present invention to provide a process for rapidly dehydrating cellular foodstuffs. It is another object to provide dehydrated cellular foodstuffs which are more easily rehydrated and have a larger size and improved texture, flavor and color.

DESCRIPTION OF THE INVENTION

According to the present invention a cellular foodstuff such as fruits, vegetables, meats or seafoods having their normal moisture content is placed in a pressure vessel and the pressure in the vessel is raised to about 50 – 1500 lbs. psig or higher. While the food material is held at the elevated pressure the temperature is reduced to about −20° to −25°C. and the foodstuff is permitted to thoroughly freeze. Then while the foodstuff is still frozen the pressure is released.

According to the process of this invention complete freezing is necessary in order to achieve the desired effect of increased permeability. Just cooling to 0°C. gives no effect; freezing at −10°C. gives only an inferior effect because freezing is incomplete. Experiments have also been conducted at extremely low temperatures, such as celery at −60°C., however, the frozen foodstuffs tend to shatter after the pressure is removed.

The parameters of pressure freezing which have been found to be important are the pressure and the temperature. However, it is necessary, in order to achieve the full effect of this invention, that the pressure be released before the foodstuff is thawed.

Immediate drying is not necessary, most of the effect is retained even if drying takes place several hours after thawing or even after overnight storage at room temperature. Rates of pressurization and pressure release are not critical, although with bulky, non-porous materials, pressurization may take much longer, since it appears diffusion of the gas into the interior of the material is an important criteria of this invention.

The pressure to which the foodstuff is subjected will depend on the type of foodstuff and the effect desired. For instance, if it is desired to render the foodstuff highly permeable, a high pressure will be used, whereas if a mild permeability increase is desired, a lower pressure is sufficient. Also some foodstuffs require a much lower pressure to obtain a desired result, while others require a high pressure to obtain the same result.

Another variable to be considered in determining the pressure to be used is the means used to increase the pressure. The pressure necessary to produce a desired result depends upon the particular gas being used. For instance, when using some of fluorinated hydrocarbon gases such as dichlorodifluoromethane (Freon −12) to pressurize celery, favorable results are obtained at pressures as low as 50 psig, whereas when using gases such as air or nitrogen, higher pressures are required to achieve equivalent results. A further limitation in the selection of the gas to be used is its physical characteristics. For example Freon 12 cannot be used at pressures in excess of 70 psig because this gas begins to liquefy at this pressure and ambient temperature conditions.

Considerable work has been done on the mechanism of pressure-freezing and drying, and, it appears, although it is not wished to be limited to such, that when the cellular materials are pressurized with a gas, the gas diffuses into the cells and displaces a portion of the liquid material normally present in the cells. During freezing the gas is prevented from leaving the cells. This may be due to gas being forced out of solution during freezing and then becoming trapped between ice crystals and also due to some of this gas being forced into spaces from which it does not readily escape, even during thawing. The above theory appears to account for most of the observed phenomena such as; change in size, softer at a given temperature in the frozen state (gas between crystals, smaller crystal size), less shrivelling upon drying (the gas prevents collapse of the cells from the action of capillary forces), more rapid dehydration (pushing out the liquid with the gas).

None of the advantages of this invention have been found to occur by merely pressurizing cellular materials. Evidently without the freezing step any gas absorbed by the cellular material under pressure is not retained once the pressure is removed.

All gases seem to have an effect on the pressure frozen product in its frozen state. However, certain gases have not proven successful in applications in which the frozen product is thawed and dried. These gases apparently diffuse too quickly from the thawed product to prevent collapse of the cells.

When we evaluate the combination of pressurefreezing, thawing and drying gases may be divided into separate categories based on their effect. Among the effective gases shown with a typical operating pressure (psig.) are: methane (1000), nitrogen (1000), carbon monoxide (1000), $CF_4$, Freon 14, (250), air (1000), $CClF_3$, Freon 13, (450), ethane (540), neon (1000), argon (1000), ethylene (840), propane (110), $CCl_2F_2$, Freon 12, (70), and $C_2ClF_5$, Freon 115, (102). Among the gases which are ineffective because they are not effectively retained within the cellular food material during thawing and drying operations are; carbon dioxide (250), nitrous oxide (745), and helium (1000). Among the gases which are ineffective because of the low pressures which must be used are; butane (16), isobutane (30), $C_4F_8$ (Freon 318) (25), and ethylene oxide (7.3).

In general the effective gases are those which have low diffusion rates through thin rubber membranes and damp dialysis membranes (regenerated cellulose). Additionally it is desirable if the gas does not have a high solubility in water. These effective gases may be used alone or in combination with these or other gases.

The pressure-frozen food has utility in its frozen state or it can be further treated, depending on the desired end use of the product. As noted above certain fruits can be pressure-frozen and stored in the frozen state to serve as a new type dessert. As examples of this dessert are pressure-frozen bananas, pineapple and strawberries. When one desires to eat some of the fruit, such as the banana, he merely removes it from the freezer and eats it as it is. The frozen fruit has the desirable qualities of being cold and yet soft. The invention also has application in the frozen food area, providing a frozen food that requires a much shorter cooking time. This application is particularly useful for such vegetables as green beans, peas, etc.

The pressure frozen foods can be further treated in one of the following ways. Firstly, if it is desired to prepare a dehydrated product, the food can be dried. The drying can be done by the freeze-drying method, in which case the commodity is directly dried in the frozen state, or by the air-drying method in which case the material to be dried is exposed to a current of air. Secondly, the pressure-frozen foodstuff can be thawed and/or dehydrated and then subjected to such further treatments as extraction or infusion by contacting the permeable foodstuff with either a fluid in which the substance to be extracted is soluble or a fluid containing the substance to be infused. These two treatments are of great benefit where it is desired to extract certain substances from the food or to add various substances to the food such as natural and synthetic sweetening agents, flavoring additives of texture modifiers. The selection of appropriate operating conditions for infusion and extraction operations will be readily apparent to those skilled in the art. It will often be desirable, especially in cases of infusion, to dehydrate the permeable foodstuff before extract or infusion treatments.

When the after treatment of the material is to be dehydration it is often preferred to use the freeze-drying method. This is usually the case when fruits and vegetables which contain volatile food flavor components are to be treated, because the higher temperatures of the ordinary drying methods destroy much of the flavor of the fresh fruit or vegetable. A further advantage of freeze-drying is that the food being dried does not shrivel to any great degree, such as is the case with coventional drying. Freeze-drying is particularly desirable for drying fruits such as strawberries, bananas, and oranges and vegetables such as peas, stringbeans and celery. When fruits such as oranges are treated according to the present process and freeze-dried, the texture of the fruit is uniform throughout due to uniform dehydration, whereas in the conventional freeze-drying process the center of the fruit often forms a hard core or there may be surface case hardening, and in either of these cases the food does not rehydrate properly and has an undesirable texture.

Sometimes in preparing dried fruits it is preferable to air-dry rather than freeze-dry the food. This is often the case when appearance is of secondary importance in view of economics, the cost of air-drying being considerably less than freeze-drying. The present invention now makes it possible to air-dry many foods without impairing their appearance. Thus, vegetables such as carrots, peas, celery and onions and meats and seafoods such as chicken and codfish can be air-dried after being pressure-frozen, yielding a product that shows little or no shrivelling. For example, air-dried celery which had been frozen while at 1400 psig. had a bulk density 5 ½ times that of regular air-dried celery. Further, many foods, such as peppers and cantaloupe, which could not formerly be air-dried to give a commercially acceptable product can now be air-dried after being pressure-frozen.

In order that the invention may be better understood the following examples will serve to illustrate specific applications of the invention.

EXAMPLE I

Fresh celery was cut into pieces about ¼ × ½ inch in size and placed in a parr bomb. The pressure in the bomb was raised to 1000 psig. over a period of 100 minutes by means of compressed nitrogen gas. The bomb was then placed in an ethylene glycol bath having a temperature of −22°C. and held there for 2 hours after which the pressure was reduced to atmospheric over a period of 1 ½ hours while maintaining the bomb in the bath. The celery was removed from the bomb and dried in a Proctor & Schwartz forced draft drier for one hour at 50°C. and then for 17 hours at 30°C. at which point the drying of the celery was complete.

As controls, fresh celery and celery frozen at atmospheric pressure were dried under identical conditions. The pressure-frozen sample rehydrated very rapidly yielding a product having very good structure and shape while the controls rehydrated very slowly and were badly shrivelled.

EXAMPLE II

Fresh celery was pressure-frozen and air-dried according to the procedure of Example I except that the pressure was varied. The results are tabulated below. The control was air-dried without pressure freezing.

TABLE I

| Pressure, psig. | Results |
| --- | --- |
| Control | Very slow rehydration, product very shrivelled. |
| 100 psig. | Slow rehydration, some shrivelling. |
| 600 psig. | Good rehydration, product was slightly shrivelled. |
| 1400 psig. | Very good rehydration, product was not shrivelled. |

This example shows that as the pressure at which freezing is carried out is increased the product quality and rehydratability is improved.

EXAMPLE III

Fresh celery was pressure-frozen and air-dried according to the procedure of Example I except that the gas used was varied. The pressure at which freezing took place was 1000 psig. The results are tabulated below. The control was air-dried without being pressure frozen.

TABLE II

| Gas Used | Product Characteristics |
| --- | --- |
| Control | Slow rehydration, extensive shrivelling. |
| Methane | Very rapid rehydration, very slight shrivelling. |
| Carbon Monoxide | Fast rehydration, slight shrivelling. |
| Air | Fast rehydration, slight shrivelling. |

This example shows that the product characteristics vary only to a slight degree when different gases are used to produce the pressure.

EXAMPLE IV

Example I was repeated using peppers, onions, potatoes, cooked rice, stringbeans, canteloupe, boiled codfish, boiled chicken and fresh, sliced coconut in place of the celery. In each case the product had a better shape and texture and rehydrated faster than the regular airdried counterpart. In the case of the coconut a product having a better flavor and less chewiness was obtained.

EXAMPLE V

Fresh strawberries were pressure-frozen according to the procedure of Example 1. The frozen strawberries were then freeze-dried. The dried strawberries had a firmer and more uniform texture, a better flavor, and rehydrated more rapidly than strawberries frozen at the same temperature but at atmospheric pressure. The drying rate of the pressure frozen strawberries was about 30 percent greater than the drying rate of the strawberries frozen at atmospheric pressure.

EXAMPLE VI

Example V was repeated except that bananas, oranges, apples and tomatoes were substituted for the strawberries. The products had better flavor and texture and dehydrated and rehydrated more uniformly and rapidly than the regular freeze-dried counterpart.

EXAMPLE VII

Fresh strawberries were pressure-frozen in a nitrogen atmosphere at 1000 psig. and stored in the freezer compartment of a refrigerator wit strawberries frozen at atmospheric pressure. After permitting the strawberries to reach equilibrium they were taken from the freezer and tasted without thawing. The pressure frozen strawberries were soft and had a very good flavor while the strawberries frozen at atmospheric pressure were frozen hard and had very little flavor. The pressure-frozen strawberries were larger than those frozen at atmospheric pressure.

EXAMPLE VIII

Example VII was repeated except that blueberries were substituted for the strawberries. Again the pressure-frozen blueberries were softer and sweeter than the blueberries frozen at atmospheric pressure.

Examples VII and VIII illustrate that pressure-treated foods can be eaten without the necessity of being thawed.

EXAMPLE IX

Fresh stringbeans were cut in 1 ½ inch strips, blanched for 1 minute in boiling water, removed from the water and divided into two portions. The first portion was frozen in a nitrogen atmosphere at 1000 psig., and the second portion was frozen at atmospheric pressure. Both portions were stored in a freezer until equilibrium was reached and they they were cooked by placing them in boiling water. The pressure treated sample became soft and edible in 6 – 8 minutes while those frozen at atmospheric pressure required 10 – 12 minutes to reach the same degree of softness.

Example IX shows that freezing fresh foods under pressure reduces the cooking time of the frozen food.

Although the examples are directed only to the improvement of food products it is understood that the present invention can be used in non-food applications such as the extraction of oils, etc., from cellular materials such as olives, fresh hops and perfume-yielding plants, and obvious variations and modifications of the invention may be performed without departing from the scope of the invention.

Having thus described the invention what is claimed is:

1. A method of increasing the permeability of cellular food material, without substantially disrupting the cell structure, comprising the steps of:
    a. placing the cellular foodstuff in a pressure vessel,
    b. raising the pressure in the vessel to greater than about 50 p.s.i.g. with a gas selected from the group consisting of methane, carbon monoxide, nitrogen, dichlorodifluoromethane and air, the pressure being sufficient to permeate the cellular material with the gas.
    c. completely freezing said pressurized cellular material at about −20°C. to −25°C., and then
    d. releasing the pressure on the completely frozen cellular material.

2. The method according to claim 1 wherein the frozen material is thawed and contacted with a fluid in which a substance to be extracted from said material is soluble.

3. The method according to claim 1 wherein the frozen material is thawed and contacted with a fluid containing a substance to be infused into said material.

4. The method according to claim 1 wherein the frozen material is dehydrated and then contacted with a fluid containing a substance to be infused into said material.

5. The method according to claim 4 wherein the method of dehydration is air-drying.

6. The method according to claim 1 wherein the frozen material is dehydrated.

7. The method according to claim 6 wherein the method of dehydration is freeze-drying.

8. A freeze-dried, cellular, food material produced in accordance with claim 6.

9. The method according to claim 1 wherein the cellular material is selected from the group consisting of fruits and vegetables.

10. A method for producing a soft, frozen cellular food material, selected from the group consisting of fruits and vegetables, without substantially disrupting the cell structure, comprising the steps of:
    a. placing the cellular foodstuff in a pressure vessel,
    b. raising the pressure in the vessel to greater than about 1000 p.s.i.g. with a nitrogen containing gas,
    c. completely freezing said pressurized cellular material at about −20°C to −25°C, and then
    d. releasing the pressure on the completely frozen cellular material.

11. A soft, frozen food product produced in accordance with claim 10.

* * * * *